United States Patent
Hewins et al.

(10) Patent No.: US 12,490,761 B2
(45) Date of Patent: Dec. 9, 2025

(54) LIQUID CONCENTRATE DELIVERY SYSTEM

(71) Applicant: FIRMENICH SA, Satigny (CH)

(72) Inventors: Valerie Hewins, Plainsboro, NJ (US); Lou Long-In, Plainsboro, NJ (US); Ronald Skiff, Plainsboro, NJ (US)

(73) Assignee: FIRMENICH SA, Satigny (CH)

( * ) Notice: Subject to any disclaimer, the term of this patent is extended or adjusted under 35 U.S.C. 154(b) by 353 days.

(21) Appl. No.: 17/277,594

(22) PCT Filed: Jan. 22, 2020

(86) PCT No.: PCT/EP2020/051467
§ 371 (c)(1),
(2) Date: Mar. 18, 2021

(87) PCT Pub. No.: WO2020/152201
PCT Pub. Date: Jul. 30, 2020

(65) Prior Publication Data
US 2022/0110353 A1    Apr. 14, 2022

Related U.S. Application Data

(60) Provisional application No. 62/797,159, filed on Jan. 25, 2019.

(30) Foreign Application Priority Data

Apr. 16, 2019 (EP) .................... 19169443

(51) Int. Cl.
*A23L 2/06* (2006.01)
*A23L 2/385* (2006.01)
(Continued)

(52) U.S. Cl.
CPC ............... *A23L 29/10* (2016.08); *A23L 2/06* (2013.01); *A23L 2/385* (2013.01); *A23L 2/56* (2013.01);
(Continued)

(58) Field of Classification Search
CPC ... A23L 2/60; A23L 29/10; A23L 2/56; A23L 2/06
See application file for complete search history.

(56) References Cited

U.S. PATENT DOCUMENTS 8,795,757 B2    8/2014 Schrader et al.
2007/0196496 A1  8/2007 Farber et al.
(Continued)

FOREIGN PATENT DOCUMENTS

JP    2009518027 A    5/2009
WO    2007066233 A2   6/2007

OTHER PUBLICATIONS

International Search Report and Written Opinion for corresponding PCT/EP2020/051467 mailed Feb. 4, 2020, 13 pages.

*Primary Examiner* — Jenna A Watts (57) ABSTRACT

Described herein is a delivery system including a non-aqueous solvent, a stabilizing agent selected from the group consisting of ester gum, sucrose acetate isobutyrate, Neobee oil, sugar alcohol, fructose and mixtures thereof, a surfactant selected from the group consisting of sucrose monoester, lecithin, modified starch, and mixtures thereof, at least one of an acid, acid salt or sweetener, and an active ingredient, where the delivery system includes 15% by weight or less of water. Also described herein is a process for preparing the delivery system and a method of delivering and protecting an active ingredient.

8 Claims, 4 Drawing Sheets

Citral degradation for lemon flavored LCDS vs. standard water enhancer type concentrate over 13 week accelerated storage in temperature control chamber at 37°C.

(51) Int. Cl.
*A23L 2/56* (2006.01)
*A23L 2/60* (2006.01)
*A23L 2/68* (2006.01)
*A23L 29/10* (2016.01)
*A23L 29/212* (2016.01)

(52) U.S. Cl.
CPC *A23L 2/60* (2013.01); *A23L 2/68* (2013.01); *A23L 29/212* (2016.08)

(56) References Cited

U.S. PATENT DOCUMENTS

| | | |
|---|---|---|
| 2009/0175982 A1 | 7/2009 | Boghani et al. |
| 2010/0323066 A1 | 12/2010 | Comstock |
| 2013/0040036 A1 | 2/2013 | Zeller et al. |
| 2014/0147569 A1 | 5/2014 | Poulsen et al. |
| 2017/0247647 A1* | 8/2017 | Lee .................. A23L 29/27 |
| 2018/0249747 A1 | 9/2018 | Ma et al. |

* cited by examiner

Figure 1: Citral degradation for lemon flavored LCDS vs. standard water enhancer type concentrate over 13 week accelerated storage in temperature control chamber at 37°C Figure 2: Citral degradation products (p-cresol and p-methylacetophenone) generation for lemon flavored LCDS vs. water enhancer type concentrate over 13 week accelerated storage in temperature control chamber at 37°C Figure 3: Flavor attributes intensity data for lemon flavored LCDS vs. water enhancer type concentrate aged in temperature controlled chamber for 4 weeks.

Figure 4: Overall and Flavor Acceptance for lemon flavored LCDS vs. water enhancer type concentrate aged in temperature controlled chamber for 4 weeks.

LIQUID CONCENTRATE DELIVERY SYSTEM

CROSS-REFERENCE TO RELATED APPLICATIONS

This application is a U.S. National Phase Application of International Patent Application No. PCT/EP2020/051467, filed Jan. 22, 2020, which claims the benefit of priority to U.S. Provisional Patent Application No. 62/797,159, filed Jan. 25, 2019, and which claims the benefit of priority to European Patent Application No. 19169443.9, filed Apr. 16, 2019, the entire contents of which are hereby incorporated by reference herein.

TECHNICAL FIELD

The present invention relates to the field of liquid food and beverage systems used to stabilize food ingredients for example against oxidation and/or acid catalyzed degradation.

BACKGROUND

Current water-based liquid food and beverage systems often provide insufficient solubility properties for specific ingredients, thus limiting the amount of the ingredients that may be added to a water-based liquid food or beverage system. Moreover, some flavors for food or beverages, such as citrus flavors, are unstable in aqueous liquid food or beverage systems having a low pH. Moreover, from a consumer point of view, it would be desirable to provide a liquid food and beverage system which has a clear appearance. Moreover, from a practical point of view it would be desirable to provide a liquid food and beverage system which provides low viscosity.

WO 2015/165738 A1 describes an eutectic flavor system which is able to stabilize citrus flavors. WO 2015/165738 A1, however, does not disclose or suggest the use of weighting agents in combination with surfactants in order to provide a clear micro-emulsion and providing lower viscosity.

WO 2017/050827 A1 describes oil in water micro-emulsions which are able to provide a stable clear aqueous food or clear beverage. WO 2017/050827 A1, however, does not disclose or suggest the use of at least one of an acid, acid salt and sweetener in order to provide a more complete delivery system for flavors.

US 2013/0040036 A1 describes liquid beverage concentrates providing stability to flavor, artificial sweeteners, vitamins, and/or color ingredients.

US 2010/0323066 A1 describes a process allowing the solubilization of flavor oil in water to produce clear beverages.

U.S. Pat. No. 8,795,757 B2 describes compositions with a surfactant system comprising saponins and lecithin.

US 2007/0196496 A1 describes oral gel delivery systems comprising an ingestible matrix within which one or more functional ingredients are substantially uniformly and completely dispersed.

US 2009/0175982 A1 describes a delivery system for inclusion in an edible composition having at least one ingredient encapsulated with an encapsulating material.

To the best of our knowledge, the prior art did not disclose or suggest a liquid concentrate delivery system according to the present invention.

DETAILED DESCRIPTION

According to a first aspect, the present invention relates to a delivery system comprising:
- a non-aqueous solvent,
- a stabilizing agent selected from the group consisting of ester gum, sucrose acetate isobutyrate, Neobee oil, sugar alcohol, fructose and mixtures thereof,
- a surfactant selected from the group consisting of sucrose monoester, lecithin, modified starch, and mixtures thereof;
- at least one of an acid, acid salt and sweetener and
- an active ingredient, wherein the delivery system comprises 15% by weight or less of water.

According to a preferred embodiment, the delivery system is a liquid delivery system. Thereby, is understood that the delivery system is in liquid form which can be used and added to a food or beverage as a liquid.

According to a preferred embodiment, the liquid delivery system has a viscosity of less than 1.2 Pa·s, preferably less than 1.0 Pa·s, even more preferably less than 0.8 Pa·s. According to a preferred embodiment, the liquid delivery system has a viscosity of at least 0.4 Pa·s. Viscosities were measured by using the rheometer Anton Paar Rheometer. Viscosities were measured at 25° C. The experiments were realized with a steel cone with 49.970 mm diameter and 0.492° cone angle. The gap between the cone and the plate, on which the composition is deposited, was 0.048 mm. The measurement was done under 1 to 100/s shear rate and average was taken.

According to a preferred embodiment, the delivery system is in form of an emulsion or a micro-emulsion. The term "micro-emulsion" has the normal meaning of the term to a person skilled in the art. In accordance with the IUPAC definition, the term "micro-emulsion" as herein described is understood as a dispersion made of water, oil, and surfactant(s) that is an isotropic and thermodynamically stable system with dispersed domain diameter varying from about 1 to about 100 nm, typically from about 10 to about 70 nm, preferably from about 20 to about 50 nm. Dynamic light Scattering, Zetasizer Nano ZS90 was used to measure the diameter.

According to a preferred embodiment, the delivery system in form of an emulsion or micro-emulsion comprises the non-aqueous solvent and optionally the surfactant and at least one of an acid, acid salt and sweetener in the continuous phase and the active ingredient and stabilizing agent and optionally the surfactant and at least one of an acid, acid salt and sweetener in the dispersing phase.

According to a preferred embodiment, the delivery system has a pH, upon 100-fold dilution, in the range of from about 1.7 to about 7, more particularly from about 2 to about 4, even more preferably at about 3 to about 4.

According to the present invention, the delivery system comprises a non-aqueous solvent. According to a preferred embodiment, the non-aqueous solvent is a food grade solvent, in particular a non-aqueous solvent for the use for food compositions, in particular in combination with flavor ingredients. According to a preferred embodiment, the non-aqueous solvent is selected from the group consisting of glycerol, propylene glycol and 1,3-propanediol, preferably glycerol.

According to a preferred embodiment, the delivery system comprises the non-aqueous solvent in an amount of 40 wt. % to 90 wt. %, preferably 45 wt. % to 85 wt. % and even more preferably 50 wt. % to 80 wt. % based on the weight of the total delivery system.

A skilled person is able to adapt any of the delivery systems by means of dilutions using a non-aqueous solvent, such as glycerol, propylene glycol, 1,3-propanediol or combinations thereof, and/or other solvents, such as even water at very low levels. According to an embodiment, the delivery system may be diluted in a delivery system to solvent range of 1:10 to 1:200, 1:30 to 1:150 or 1:40 to 1:100.

According to the present invention, the delivery system comprises a surfactant selected from the group consisting of sucrose monoester, lecithin, modified starch, and mixtures thereof. According to a preferred embodiment, the surfactant is selected from the group consisting of sucrose monoester or modified starch. The term "sucrose monoester" has the normal meaning of the term to a person skilled in the art. Particular examples of sucrose monoesters comprise sucrose monopalmitate, sucrose monolaurate, sucrose monomyristate, sucrose monooleate, preferably sucrose monopalmitate and sucrose monolaurate. The term "modified starch" has the normal meaning of the term to a person skilled in the art. Particular examples of modified starches comprise hydroxypropylated starch, phosphate starch phosphate, octenylsuccinated starch, starch aluminium octenyl succinate, acetylated distarch phosphate, acetylated distarch adipate, acetylated distarch adipate, hydroxypropyl distarch phosphate and acetylated oxidized starch.

According to a preferred embodiment, the delivery system comprises the surfactant in an amount of 0.15% and 1.5%, preferably between 0.2% and 0.8%, based on the weight of the total delivery system.

According to a preferred embodiment, the weight ratio of surfactant, preferably modified starch, to final water content is about 1:4 to about 1:8, preferably from 1:5 to 1:6.

According to a particular embodiment, the delivery system comprises in addition to the surfactant a water-soluble polymer, preferably chosen from the group consisting of maltodextrin, guar gum and mixtures thereof.

According to a preferred embodiment, the delivery system comprises in addition to the surfactant a co-solvent. According to a preferred embodiment, the co-solvent is a 02-6 alcohol, preferably butanol.

According to a preferred embodiment, the delivery system comprises the co-solvent in an amount of 0.05 wt. % to 0.7 wt. %, preferably from 0.1 wt. % to 0.5 wt %, based on the weight of the total delivery system.

According to the present invention, the delivery system comprises a stabilizing agent selected from the group consisting of ester gum, sucrose acetate isobutyrate, Neobee oil, sugar alcohol, fructose and mixtures thereof. According to a preferred embodiment, the stabilizing agent is selected from the group consisting of sucrose acetate isobutyrate, Neobee oil, fructose and sugar alcohol. The term "ester gum" has the normal meaning of the term to a person skilled in the art. Particular examples of ester gums comprise glycerol ester of wood rosin. The term "Neobee oil" has the normal meaning of the term to a person skilled in the art. Neobee is a caprylic and capric triglyceride. It is made using glycerol from vegetable oil sources and medium-chain fatty acids from coconut and palm kernel oils.

According to a preferred embodiment, the sugar alcohol is selected from the group consisting of erythritol, isomalt, lactitol, maltitol, mannitol, xylitol and sorbitol and mixtures thereof, preferably erythritol and sorbitol and mixtures thereof, more preferably sorbitol.

According to a preferred embodiment, the delivery system comprises the stabilizing agent in an amount of 0.3 wt. % to 8 wt. %, preferably of 0.5 wt. % to 5 wt. %, based on the weight of the total delivery system.

According to the present invention, the delivery system comprises an active ingredient. In a particular embodiment, the active ingredient is suitable for use in food and beverages. In a particular embodiment, the active ingredient is suitable for use in food and beverages and wherein the active ingredient is susceptible to oxidation and/or acid degradation.

According to a preferred embodiment, the active ingredient is a hydrophobic active ingredient. The active ingredient may be a hydrophobic active ingredient, such as flavor or flavor compositions or fragrance or fragrance compositions having a log P value of 2 or more. The log P refers to the logarithm (log) of the partition coefficient (P) and defines a particular ratio of the concentrations of a solute between two solvents (a biphase of liquid phases), specifically for un-ionized solutes. A person skilled in the art is able to determine and measure the log P.

According to a preferred embodiment, the active ingredient is a flavor or fragrance. By the term "flavor" it is herein understood a flavor or flavoring composition being a flavoring ingredient or a mixture of flavoring ingredients, solvents or adjuvants used for the preparation of a flavoring formulation, i.e. a particular mixture of ingredients which is intended to be added to a drinkable or edible composition (including but not limited to a beverage) or chewable product to impart, improve or modify its organoleptic properties, in particular its flavor and/or taste. Flavoring ingredients are well known to a person skilled in the art and their nature does not warrant a detailed description here, which in any case would not be exhaustive, the skilled flavorist being able to select them on the basis of his or her general knowledge and according to the intended use or application and the organoleptic effect it is desired to achieve. By the term "fragrance" it is herein understood a fragrance or fragrance composition being a fragrance ingredient or a mixture of fragrance ingredients, solvents or adjuvants used for the preparation of a fragrance formulation, i.e. a particular mixture of ingredients which is intended to be added to a perfuming composition. Fragrance ingredients are well known to a person skilled in the art and their nature does not warrant a detailed description here, which in any case would not be exhaustive, the skilled perfumer being able to select them on the basis of his or her general knowledge and according to the intended use or application and the olfactive effect it is desired to achieve. Many of these fragrance and flavoring ingredients are listed in reference texts such as in the book by S. Arctander, Perfume and Flavor Chemicals, 1969, Montclair, N.J., USA, or its more recent versions, or in other works of similar nature such as Fenaroli's Handbook of Flavor Ingredients, 1975, CRC Press or Synthetic Food Adjuncts, 1947, by M. B. Jacobs, van Nostrand Co., Inc. Solvents and adjuvants of current use for the preparation of a fragrance or flavoring formulation are also well known in the industry.

According to a preferred embodiment, the active ingredient is a flavor. Typical flavors to be used in the delivery system according to the present invention are flavors that are derived from or based on fruits where citric acid is the predominant, naturally-occurring acid include but are not limited to, for example, citrus fruits (e.g., lemon, lime), limonene, strawberry, orange, and pineapple. In one embodiment, the flavor is lemon, lime or orange juice extracted directly from the fruit. Further embodiments of the flavor comprise the juice or liquid extracted from oranges, lemons, grapefruits, limes, citrons, Clementines, mandarins, tangerines, and any other citrus fruit, or variation or hybrid thereof. In a particular embodiment, the flavor comprises a liquid extracted or distilled from oranges, lemons, grapefruits, limes, citrons, Clementines, mandarins, tangerines, any other citrus fruit or variation or hybrid thereof, pomegranates, kiwifruits, watermelons, apples, bananas, blueberries, melons, ginger, bell peppers, cucumbers, passion fruits, mangos, pears, tomatoes, and strawberries.

In a particularly preferred embodiment, the flavor is lemon or lime. In a further embodiment the flavor comprises citral.

According to a preferred embodiment, the delivery system comprises the active ingredient, preferably a flavor, in an amount of about 0.01 wt. % to about 10 wt. % and preferably about 0.10 wt. % to about 2.99 wt. %, based on the weight of the total delivery system.

According to a preferred embodiment, the weight ratio of stabilizing agent to active ingredient, preferably a flavor, is equal or less than about 0.25:1 to 7:1, preferably 0.4:1 to 8:1.

According to a preferred embodiment, the weight ratio of surfactant, preferably sucrose monoester, to active ingredient, preferably a flavor, is about 0.3:1 to about 0.9:1, preferably about 0.5:1 to about 0.7:1.

According to a preferred embodiment, the weight ratio of surfactant, preferably lecithin, to active ingredient, preferably a flavor, is about 0.04:1 to about 0.1:1, preferably about 0.05:1 to about 0.08:1.0.

According to a preferred embodiment, the weight ratio of co-solvent, preferably butanol, to active ingredient, preferably a flavor, is about 0.2:1 to about 0.6:1, preferably about 0.3:1 to about 0.5:1.

According to the present invention, the delivery system comprises at least one of an acid, acid salt and sweetener. According to a particular embodiment, the delivery system comprises at least two of an acid, acid salt and sweetener. According to a preferred embodiment, the delivery system comprises an acid and acid salt. According to a further particular embodiment, the delivery system comprises an acid, acid salt and sweetener.

According to the present invention, the delivery system may comprise an acid. According to a particular embodiment, the acid is a food grade acid. According to a preferred embodiment, the acid is selected from the group consisting of malic acid, citric acid, maleic acid, lactic acid, tartaric acid, sorbic acid and mixtures thereof.

According to a preferred embodiment, the delivery system comprises the acid, preferably citric acid, in an amount of 0.01 wt. % to 10 wt. %, preferably of 6 wt. % to 8 wt. %, based on the weight of the total delivery system.

According to the present invention, the delivery system may comprise an acid salt. According to a particular embodiment, the acid salt is a food grad acid salt. According to a preferred embodiment, the acid salt is selected from the group of consisting of sodium citrate, sodium lactate, sodium benzoate, sodium sorbate, sodium phosphate, potassium citrate, potassium sorbate, potassium phosphate, calcium phosphate and mixtures thereof.

According to a preferred embodiment, the acid salt relates to a counter-ion of an acid wherein the acid is also provided as a component of the delivery system herein described. In a particular embodiment, the salt comprises a conjugate base of an acid wherein the acid is provided as a component of the delivery system herein described. According to a preferred embodiment, the acid and acid salt are present in an amount that results in an acceptable pH after dilution, typically between 2.5 and 5.

According to a preferred embodiment, the delivery system comprises the acid salt in an amount of 7 wt. % to 16 wt. %, preferably of 10 wt. % to 15 wt. %, based on the weight of the total delivery system.

According to a preferred embodiment, the delivery system may comprise a sweetener. A sweetener according to the present invention relates to natural sweeteners or artificial sweeteners. According to a preferred embodiment, the sweetener according to the present invention relates to natural and artificial sweeteners except of mono- or disaccharides. According to a preferred embodiment, the sweetener according to the present invention is a low-glycemic sweetener. A low-glycemic sweetener has a glycemic index (GI) of 55 or less, preferably of 50 or less. According to a preferred embodiment, the sweetener is selected from the group consisting of stevia extracts, glycosylated derivatives of stevia extracts, monk fruit extracts, sugars, sucralose, D-tryptophan, NHDC, polyols, stevioside, Rebaudioside A, thaumatin, mogrosides, monellin, neotame, aspartame, alitame, potassium acesulfame, saccharine, monoammonium glycyrrhizinate, calcium cyclamate, sodium cyclamate, sodium saccharin, potassium saccharin, ammonium saccharin, and calcium saccharin and mixtures thereof.

According to a preferred embodiment, the delivery system comprises the sweetener in an amount of 0% to 6%, preferably of 1.5 wt. % to 4 wt. %, based on the weight of the total delivery system.

According to the present invention, the delivery system comprises 15% by weight or less of water. According to a preferred embodiment, the delivery system comprises between 1% by weight to 15% by weight of water, more preferably 3% by weight to 14% by weight of water and even more preferably 5% by weight to 13% by weight of water, based on the weight of the total delivery system.

According to a preferred embodiment, the delivery system can be used as a flavored water enhancer, flavored waters, soft drink, diet drink, alcoholic drinks, sports drink preparations, nutraceutical drink preparation, medicinal drink formulation, beverage supplement.

In a second aspect, the present invention relates to a process for preparing a delivery system comprising the steps of:
  i) providing a non-aqueous solvent with optionally additional components chosen from the group consisting of surfactants and at least one of acids, acid salts and sweeteners and mixtures thereof to form a continuous phase;
  ii) heating the continuous phase, preferably at a temperature between 45° C. to 135° C.;
  iii) cooling the continuous phase;

iv) adding a dispersing phase comprising an active ingredient, a stabilizing agent and optionally a surfactant to the continuous phase;

v) emulsifying the mixture of step iv) to obtain an emulsion.

According to the present invention, in step i) a non-aqueous solvent is provided to form a continuous phase. Optionally and additionally, in step i) additional components can be added to the non-aqueous solvent. The additional components may be chosen from the group consisting of surfactants and at least one of acids, acid salts and sweeteners and mixtures thereof. The definition of the non-aqueous solvent, surfactants, acids, acid salts and sweeteners are the same as described hereinabove.

According to the present invention, in step ii) the continuous phase is heated. According to a preferred embodiment, the continuous phase is heated to a temperature between 45° C. to 135° C. According to a preferred embodiment, the continuous phase is heated to a temperature between 90° C. to 135° C. According to a preferred embodiment, the continuous phase is heated to a temperature between 45° C. to 100° C., preferably 65° C. to 75° C.

According to the present invention, in step iii) the heated continuous phase from step ii) is cooled. Cooling can be achieved by letting it stand at ambient temperatures for a certain period of time. Further methods for cooling are known to this person skilled in the art and may comprise passing the mixture through a heat exchanger or cooler or circulating a cooling medium through the jacket of a vessel so equipped. Preferably, the cooled continuous phase obtained from step iii) is a cooled liquid continuous phase.

According to the present invention, in step iv) a dispersing phase comprising an active ingredient and stabilizing agent is added to the continuous phase. The dispersing phase can be prepared before adding it to the continuous phase. Optionally and additionally, in step iv) additional components can be added to the dispersing phase. The additional components may be chosen from the group consisting of surfactants and at least one of acids, acid salts and sweeteners and mixtures thereof. The definition of the active ingredient, stabilizing agents, acids, acid salts and sweeteners are the same as described hereinabove.

In case no surfactant is added in step i), a surfactant has to be added in step iv). In case a surfactant is added in step i), a surfactant can be but does not need to be added in step iv).

In case at least one of acids, acid salts and sweeteners and mixtures thereof is added in step i), at least one of acids, acid salts and sweeteners and mixtures has to be added in step iv). In case at least one of acids, acid salts and sweeteners and mixtures is added in step i), at least one of acids, acid salts and sweeteners and mixtures can be but does not need to be added in step iv).

According to the present invention, in step v) the mixture resulting from step iv) is emulsified to obtain an emulsion. According to a preferred embodiment, the emulsifying step can be conducted by high shear mixing to obtain an emulsion. According to a preferred embodiment, the emulsifying step can be conducted by mixing, i.e. conventional mixing or not high shear mixing, respectively, to obtain a micro-emulsion.

According to a preferred embodiment, the delivery system as described hereinabove can be produced by the process of preparation as described hereinabove.

In a third aspect, the present invention relates to an aqueous beverage comprising the delivery system according to the present invention, wherein the ratio of the delivery system to the beverage, by weight, ranges from 1:20 to 1:200, preferably from 1:40 to 1:200.

According to a preferred embodiment, the ratio of the system to the beverage, by weight, ranges from 1:60 to 1:180.

According to a preferred embodiment, the aqueous beverage is a soft drink, such as a carbonated soft drink, including cola, lemon-lime, root beer, heavy citrus ("due type"), fruit flavored and cream sodas, and diet drink; powdered soft drinks, as well as liquid concentrates such as fountain syrups and cordials; coffee and coffee based drinks, coffee substitutes and cereal-based beverages; teas, including dry mix products as well as ready to drink teas (herbal and tealeaf based); fruit and vegetable juices and juice flavored beverages as well as juice drinks, nectars, concentrates and punches; sweetened and flavored waters, both carbonated and still; sport/energy/health drinks; alcoholic beverages plus alcohol-free and other low-alcohol products including beer and malt beverages, cider and wines (still, sparkling, fortified wines and wine coolers); other beverages processed with heating (infusions; pasteurization, ultrahigh temperature, ohmic heating or commercial aseptic sterilization) and hot-filled packaging; and cold-filled products made through filtration or other preservation techniques.

According to a fourth aspect, the present invention relates to a method of delivering an active ingredient to an aqueous beverage comprising:

i) providing an delivery system according to the present invention, described hereinabove, and ii) diluting the liquid system into an aqueous beverage to form flavored liquid beverage.

According to a fifth aspect, the present invention relates to a method of protecting an active ingredient from oxidation and/or acid catalyzed degradation comprising adding the active ingredient to a pre-delivery system comprising:

solvent, a stabilizing agent selected from the group consisting of ester gum, sucrose acetate isobutyrate, Neobee oil, sugar alcohol, fructose and mixtures thereof, a surfactant selected from the group consisting of sucrose monoester, lecithin, modified starch, and mixtures thereof;

at least one of an acid, acid salt and sweetener.

The pre-delivery system relates to the delivery system according to the present invention without the active ingredient. The definitions of the pre-delivery system and the active ingredient relate to the definitions of the ingredients of the delivery system and the active ingredient, described hereinabove.

The invention will now be described in further detail by way of the following examples. The examples are illustrative only and are not meant to limit the claims or embodiments described hereinabove.

EXAMPLES

Example 1

| Ingredients | % w/w | Water contribution to total (%) |
|---|---|---|
| Citric acid | 10.00% | |
| Lactic acid (Purac 88) | 15.00% | 2.25% |
| Sodium lactate (60% Syrup) | 15.00% | 6.00% |
| Glycerol | 54.57% | 0.38% |

-continued

| Ingredients | % w/w | Water contribution to total (%) |
|---|---|---|
| Phosphatidylcholine (Lecithin PC100) | 0.03% | |
| Starch Hi-CAP | 1.60% | |
| Sucrose acetate isobutyrate | 0.60% | |
| Sucralose | 1.50% | |
| Acesulfame-K | 0.50% | |
| Lemon Flavor | 1.20% | |
| | 100.0% | 8.63% |

Preparation

Oil Phase: Add flavour, Sucrose acetate isobutyrate, and lecithin together, mix until clear or let sit 2-3 hours until lecithin fully dissolves.
1. Heat glyceriol to 110° C. while mixing at 250 RPM.
2. Add Citric acid and mix until dissolved at 100° C.
3. Add Sucralose and Acesulfame-K and mix 15 minutes at 100° C.
4. Add Lactic Acid and Sodium Lactate syrup.
5. Cool while mixing until mixture reaches 40° C. temperature.
6. Add Starch Hi-CAP, mix 30 minutes at 1200 RPM.
7. Add oil phase and mix 15 minutes at 500 RPM.

Example 2

| Ingredients | % w/w | Water contribution to total (%) |
|---|---|---|
| Citric Acid | 5.12% | |
| Lactic Acid (Purac100) | 22.50% | 3.38% |
| Sodium Lactate (Purasal Powder S100) | 8.75% | |
| Glycerol | 50.49% | 0.35% |
| Maltodextrin | 0.02% | |
| Starch Hi-CAP | 1.92% | |
| Water | 7.40% | 7.40% |
| Sucrose acetate isobutyrate | 0.60% | |
| Sucralose | 1.50% | |
| Acesulfame-K | 0.50% | |
| Lemon Flavor | 1.20% | |
| | 100.0% | 11.13% |

Preparation

Initial Oil Phase: Mixed flavour and sucrose acetate isobutyrate.
Initial Water Phase:
1. Measured 2.4% water
2. Added 0.12% citric acid, dissolved (vortexed)
3. Added Maltodextrin, dissolved (vortexed)
4. Added starch, partially dissolved (vortexed)
5. Added 5.7% glycerol, vortexed
6. Let sit overnight at room temperature.
Combining Initial Phases:
1. Ultra sonicated water phase at 20% AMP, 2/2, time set to 4 minutes (8 minutes total), no ice bath
2. Vortexed 10 seconds
3. Put in rotating mixer 10 minutes
4. Added oil phase, vortexed 10 seconds, and repeated ultrasonicator step.
5. Vortexed 10 seconds
6. Put in rotating mixer 10 minutes.
7. Put in fridge overnight.
Base Phase:
1. Heat glycerine to 110° C. while mixing with overhead stirrer.
2. Add Sodium Lactate and mix until dissolved at 100° C.
3. Add 5% Citric Acid and mix until dissolved at 100° C.
4. Add sucralose and Acesulfame-K and mix 15 minutes at 100° C.
5. Add Lactic Acid and 5% water.
6. Cool while mixing until mixture reaches 40° C. temperature.
7. Add 'Combined Initial Phases' and mix 15 minutes.

Final Formulation: Added 12 g of above permastabil to 5% citric acid base with 5% water.

Example 3

| Ingredients | % w/w | Water contribution to total (%) |
|---|---|---|
| Lemon flavor | 1.20% | |
| sucrose acetate isobutyrate (with 10% terpene) | 0.60% | |
| Phosphatidylcholine (Lecithin PC100)* | 0.03% | |
| Citric acid | 10.00% | |
| Lactic acid (PURAC HS100) | 15.00% | |
| Sodium lactate (60% syrup) | 15.00% | 6.00% |
| Starch Hi-CAP | 1.92% | |
| Glycerol (altered with flavor amount) | 54.25% | |
| Water | 0.00% | |
| Sucralose | 1.50% | |
| Acesulfame-K | 0.50% | |
| | 100.00% | 6.00% |

Example 4

Example 4.1

| Ingredients | % w/w | Water contribution to total (%) |
|---|---|---|
| Lemon flavor | 1.1% | |
| Phosphatidylcholine (Lecithin PC100) | 0.07% | |
| Butylalcohol | 0.4% | |
| Citric acid | 8% | |
| Lactic acid 99% nat. | 5% | |
| Malic acid | 6% | |
| Sodium lactate (60% syrup) | 14.5% | 5.8% |
| Sucralose | 1.5% | |
| Acesulfame-K | 0.3% | |
| Sucrose monoester P90 | 0.6% | |
| Water | 2.8% | 2.8% |
| Glycerol | 54.73% | 0.36 |
| Sorbitol | 5% | |
| | 100.0% | 8.60% |

Example 4.2

| Ingredients | % w/w | Water contribution to total (%) |
|---|---|---|
| Lemon flavor | 0.54% | |
| Phosphatidylcholine (Lecithin PC100) | 0.04% | |
| Butylalcohol | 0.22% | |
| Citric acid | 6.0% | |
| Lactic acid 99% nat. | 6.6% | |
| Sodium lactate (60% syrup) | 9.0% | 3.6% |
| Sucrose Monoester P90 | 0.3% | |
| Water | 3.0% | 3.0% |
| Glycerol | 71.55% | |
| Sorbitol | 2.75% | |
| | 100.0% | 6.60% |

Preparation of Example 4.1 and 4.2

First, a water phase is made by following the steps below:
1. at ambient temperature, add glycerine, water, and sodium lactate and mix for 5-10 minutes or until uniform.
2. at ambient temperature, add sucrose monoester (SMP) and mix for 10 to 15 minutes or until uniformly dispersed.
3. heat the mixture with SMP to 65-75° C. while mixing; once the temperature reaches 70 C, maintain the temperature within 65-75° C. and mix for 30 to 45 minutes or until the SMP is completely dissolved. The solution should appear clear.
4. in another container, mix all the dry ingredients (i.e., citric acid, malic acid, sucralose, ace-k, and sorbital).
5. add the dry ingredients mixture into the liquid solution at 65-75° C., and mix for 20-30 minutes at 65-75° C. or until completely dissolved.
6. cool the mixture to 40-45° C. and add lactic acid while mixing for 10 minutes.
7. cool the mixture to ambient temperature and allow to deaerate overnight.

The oil phase is made by adding lecithin, butyl alcohol, and flavor oil while mixing for 20-30 minutes or until the lecithin is completely dissolved at ambient temperature. The LCDS is made by adding the oil phase into the water phase at 40-45° C. and mixed for 10-20 minutes. The LCDS is allowed to cool to ambient temperature and deaerate for 24 hours.

Example 4.3 Comparative Example

| Ingredients | % w/w |
|---|---|
| Citric acid | 20% |
| Sucralose | 1.5% |
| Acesulfame-K | 0.3% |
| Lemon flavor emulsion (5 wt % lemon flavor) | 25% |
| Potassium sorbate | 0.05% |
| Potassium citrate | 1.5% |
| Water | 51.65% |
| | 100.0% |

Figure 1:
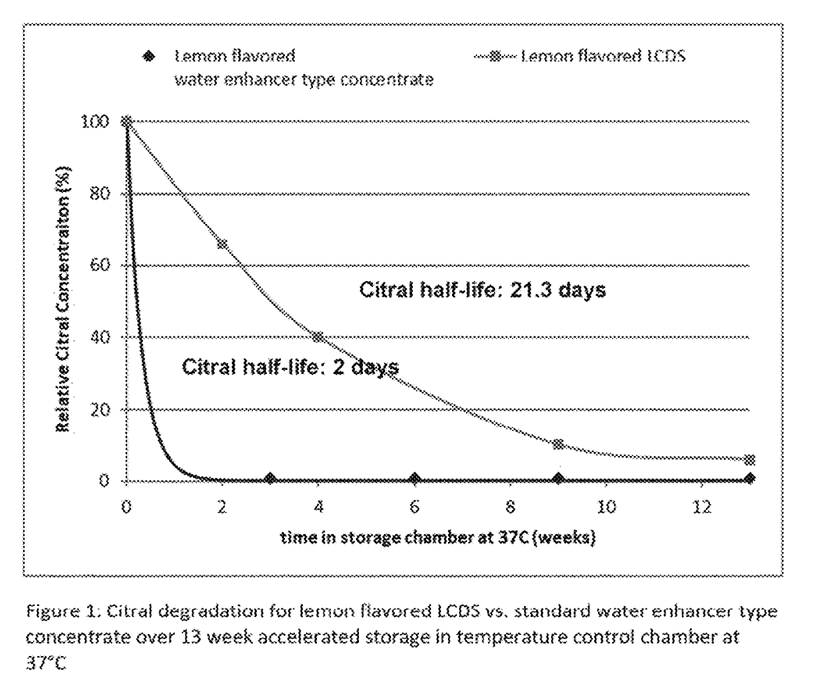
FIG. 1: Citral degradation for lemon flavored LCDS vs. standard water enhancer type concentrate over 13 week accelerated storage in temperature control chamber at 37° C.

In the following are indicated particular advantages of the present invention by comparing Example 4.1 according to the present invention with the Comparative Example 4.3 not according to the present invention:

The citral half-life of a delivery system according to the present invention (Example 4.1; indicated as Lemon flavored LCDS) stored in a temperature controlled chamber at 37° C. is more than 18 days compared to delivery system not according to the present invention (Example 4.3; indicated as Lemon flavored water enhancer type concentrate) of less than 2 days when stored in the same condition (cf. FIG. 1). The citral half-life is measured by GC-MS.

Figure 2:
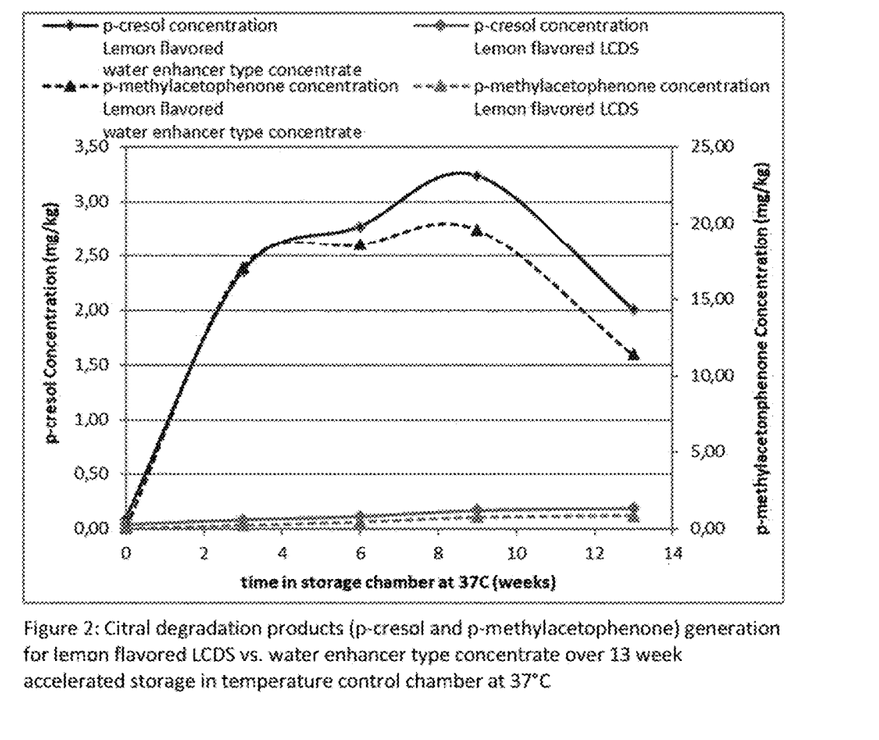
FIG. 2: Citral degradation products (p-cresol and p-methylacetophenone) generation for lemon flavored LCDS vs. water enhancer type concentrate over 13 week accelerated storage in temperature control chamber at 37° C.

The p-cresol concentration of the delivery system according to the present invention (Example 4.1; indicated as Lemon flavored LCDS) throughout 13 weeks storage in a temperature controlled chamber at 37° C. is less than 0.5 mg/kg compared to more than 1.5 mg/kg and sometime more than 3.0 mg/kg for the delivery system not according to the present invention (Example 4.3; indicated as Lemon flavored water enhancer type concentrate) stored in the same condition (cf. FIG. 2). The p-cresol concentration is measured by GC-MS. P-Cresol is a degradation product from citral, therefore the p-cresol concentration indicates the stability of citral.

The p-methylacetophenone concentration of the delivery system according to the present invention (Example 4.1; indicated as Lemon flavored LCDS) throughout 13 weeks storage at a temperature controlled chamber at 37° C. is less than 3 mg/kg compared to more than 10 mg/kg and sometime more than 17 mg/kg for the delivery system not according to the present invention (Example 4.3; indicated as Lemon flavored water enhancer type concentrate) stored in the same condition (cf. FIG. 2). The p-methylacetophenone concentration is measured by GC-MS. p-methylacetophenone is a degradation product from citral, therefore the p-methylacetophenone concentration indicates the stability of citral.

Figure 3:
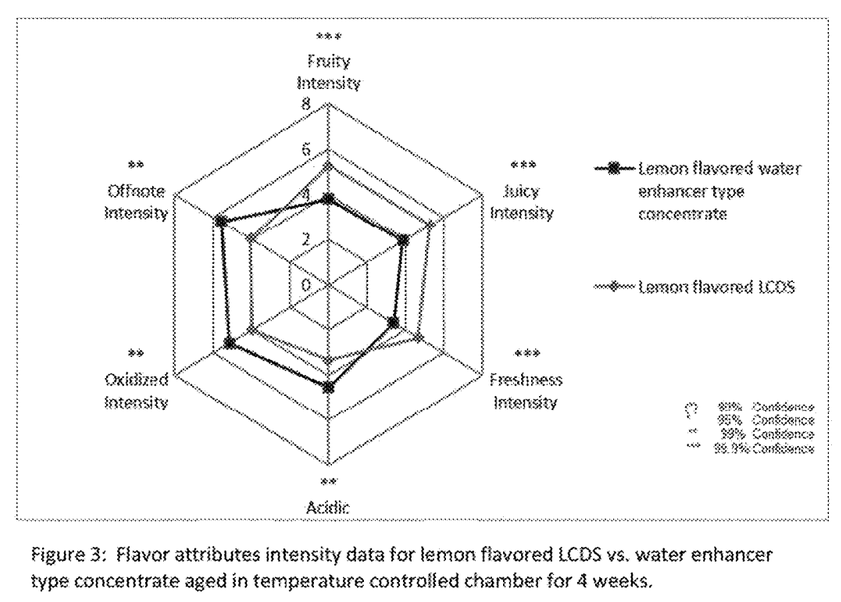
FIG. 3: Flavor attributes intensity data for lemon flavored LCDS vs. water enhancer type concentrate aged in temperature controlled chamber for 4 weeks.

The delivery system according to the present invention (Example 4.1; indicated as Lemon flavored LCDS) stored in a temperature controlled chamber at 37° C. for 4 weeks has significantly higher juicy, freshness and fruity intensity and significantly lower offnote, oxidized, and acidic intensity compared to the delivery system not according to the present invention (Example 4.3; indicated as Lemon flavored water enhancer type concentrate) stored in the same storage condition (cf. FIG. 3). The sensory performance of the delivery system according to the present invention and not according to the present invention have been conducted by an expert sensory panel.

Figure 4:
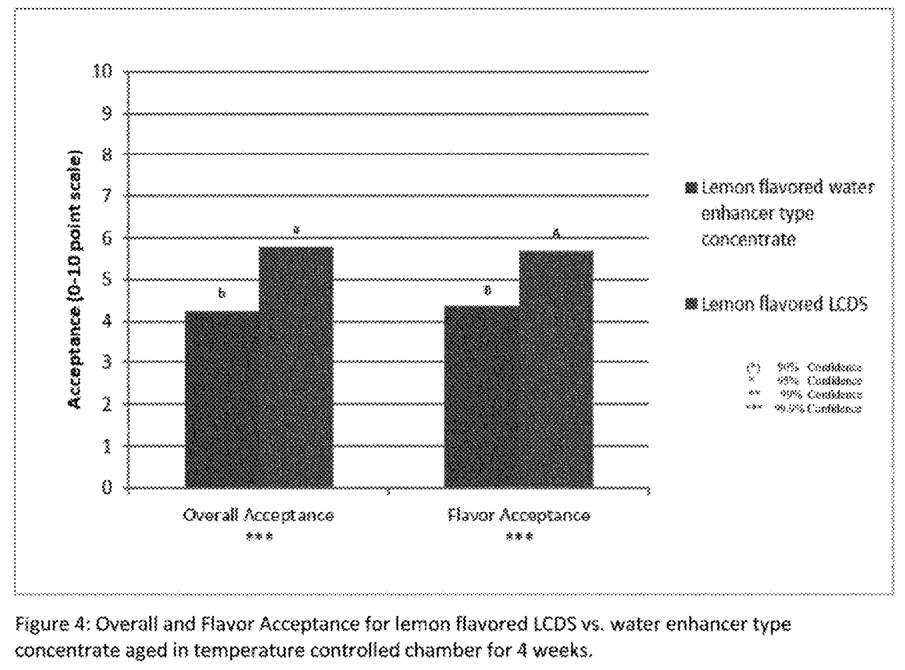
FIG. 4: Overall and Flavor Acceptance for lemon flavored LCDS vs. water enhancer type concentrate aged in temperature controlled chamber for 4 weeks.

The aged delivery system according to the present invention (Example 4.1; indicated as Lemon flavored LCDS) also has significantly higher overall and flavor acceptance compared to the aged delivery system not according to the present invention (Example 4.3; indicated as Lemon flavored water enhancer type concentrate) using the same conditions as for the sensory testing (cf. FIG. 4). The sensory performance of the delivery system according to the present invention and not according to the present invention have been conducted by an expert sensory panel.

From the comparison of Example 4.1 with the Comparative Example 4.3, it is shown that the delivery system according to the present invention (Example 4.1) shows significantly higher stability of the active ingredient (lemon flavoring), preferred sensory properties and overall and flavor acceptance over the delivery system not according to the present invention (Example 4.3).

Example 5

| Ingredients | % w/w | Water contribution to total (%) |
|---|---|---|
| Lemon Flavor | 1.20% | |
| Phosphatidylcholine (Lecithin PC100) | 0.10% | |
| Butylalcohol | 0.50% | |
| Citric acid | 5.00% | |
| Lactic Acid 99% nat. | 22.50% | |
| Sodium lactate (60% syrup) | 15.00% | 6.00% |
| Sucralose | 1.50% | |
| Acesulfame - K | 0.50% | |
| Sucrose Monoester P90 | 0.50% | |
| Glycerin | 48.20% | |
| Fructose | 5.00% | |
| | 100.00% | |

Example 6

| Ingredients | % w/w | water content |
|---|---|---|
| Floral flavor (black tea flavor) | 0.9 | 0 |
| Phosphatidylcholine (Lecithin PC100) | 0.06 | 0 |
| Butylalcohol | 0.22 | 0 |
| Finlays green tea solid | 6 | 0 |
| Sucrose Monoester P90 | 0.6 | 0 |
| Glycerin | 79.97 | 0.567787 |
| Water | 9.5 | 9.5 |
| Fructose | 2.75 | 0 |
| sum NW | 98.82 | 10.06779 |
| sum NO | 1.18 | |
| sum total | 100.00 | |

Example 7

| Ingredients | |
|---|---|
| cola heart flavor | 0.2 |
| lemon flavor | 0.06 |
| Phosphatidylcholine (PC100) | 0.02 |
| Butylalcohol | 0.05 |
| CARAMEL COLOR 2X USOC | 5.2 |
| Sucrose Monoester P90 | 0.15 |
| Citric acid | 2 |
| Phosphoric acid (80%) | 3.4 |
| Sodium lactate 60 | 3 |
| Glycerin | 78.52 |
| Water | 7.4 |
| sum NW | 99.67 |
| sum NO | 0.33 |
| | 100 |

Preparation of Example 7

First the water phase (NW) is made by following the steps below:
1. At room temperature, add glycerin, sodium lactate syrup, and water and mix until uniform
2. At room temperature, add sucrose monoester P90 and mix until uniformly dispersed (5-10 minutes)
3. Heat up the mixture to 75° C. and mix until sucrose monoester completely dissolved
4. At 75° C., add citric acid and mix until completely dissolved
5. Cool the solution to 40-45° C., add phosphoric acid and mix until uniform
6. At 40-45° C., add caramel color and mix until uniform The oil phase (NO) is made by the following steps below:
1. At room temperature, add cola heart flavor and lemon flavor and mix until uniform
2. At room temperature, add lecitin PC100 and butylalcohol and mix until uniform The LCDS is made by the following steps below:
1. At 40-45° C., add NO to NW and mix until uniform (10-15 minutes)
2. cool the solution to room temperature

The invention claimed is:

1. A delivery system comprising:
   a non-aqueous solvent, wherein the non-aqueous solvent is glycerol, in an amount of 50 wt. % to 80 wt. % based on the weight of the total delivery system,
   a co-solvent, wherein the co-solvent is butanol, in an amount from 0.1 wt. % to 0.5 wt %, based on the weight of the total delivery system,
   a stabilizing agent selected from the group consisting of sorbitol, fructose and mixtures thereof, wherein the stabilizing agent is in an amount of 0.3 wt. % to 8 wt. %, based on the weight of the total delivery system,
   a surfactant selected from the group consisting of sucrose monoester, lecithin, and mixtures thereof, wherein the surfactant is in an amount between 0.2% and 0.8%, based on the weight of the total delivery system,
   an acid, acid salt and sweetener,
   wherein the acid is a food grade acid selected from the group consisting of malic acid, citric acid, lactic acid, and mixtures thereof, and wherein the acid salt is food grade sodium lactate, and
   an active ingredient, wherein the active ingredient is a flavor comprising citral, in an amount of 0.01 to 2.99 wt. %, based on the weight of the total delivery system,
   wherein the delivery system comprises 15% by weight or less of water,
   wherein the delivery system is a liquid delivery system in the form of an emulsion or a microemulsion.

2. The delivery system according to claim 1, wherein the acid is a food grade acid.

3. The delivery system according to claim 1, wherein the acid salt is a food grade acid salt.

4. The delivery system according to claim 1, wherein the sweetener is selected from the group consisting of stevia extracts, glycosylated derivatives of stevia extracts, monk fruit extracts, sucralose, D-tryptophan, NHDC, polyols, stevioside, Rebaudioside A, thaumatin, mogrosides, monellin, neotame, aspartame, alitame, potassium acesulfame, saccharine, monoammonium glycyrrhizinate, calcium cyclamate, sodium cyclamate, sodium saccharin, potassium saccharin, ammonium saccharin, and calcium saccharin and mixtures thereof.

5. A process for preparing the delivery system according to claim 1 comprising the steps of:
   i) providing the non-aqueous solvent with sucrose monoester, the acid, acid salt, and sweetener to form a continuous phase;
   ii) heating the continuous phase;
   iii) cooling the continuous phase;
   iv) adding a dispersing phase comprising the active ingredient, the stabilizing agent, the co-solvent, and lecithin to the continuous phase; and
   v) emulsifying the mixture of step iv) to obtain an emulsion.

6. An aqueous beverage comprising the system of claim 1, wherein the ratio of the system to the beverage, by weight, ranges from 1:20 to 1:200.

7. A method of delivering an active ingredient to an aqueous beverage comprising:
   i) providing a delivery system as defined in claim 1, and
   ii) diluting the liquid system into an aqueous beverage to form flavored liquid beverage.

8. A method of protecting an active ingredient from oxidation and/or acid catalyzed degradation comprising adding the active ingredient, wherein the active ingredient is a flavor comprising citral, to a pre-delivery system to form a delivery system, the pre-delivery system comprising:

a non-aqueous solvent, wherein the non-aqueous solvent is glycerol, in an amount of 50 wt. % to 80 wt. % based on the weight of the total delivery system, a co-solvent, wherein the co-solvent is butanol, in an amount from 0.1 wt. % to 0.5 wt %, based on the weight of the total delivery system, a stabilizing agent selected from the group consisting of sorbitol, fructose and mixtures thereof, wherein the stabilizing agent is in an amount of 0.3 wt. % to 8 wt. %, based on the weight of the total delivery system, a surfactant selected from the group consisting of sucrose monoester, lecithin, and mixtures thereof, wherein the surfactant is in an amount between 0.2% and 0.8%, based on the weight of the total delivery system, and an acid, acid salt and sweetener, wherein the acid is a food grade acid selected from the group consisting of malic acid, citric acid, lactic acid, and mixtures thereof, and wherein the acid salt is food grade sodium lactate, wherein the delivery system comprises 15% by weight or less of water, wherein the delivery system is a liquid delivery system in the form of an emulsion or a microemulsion.

* * * * *